US011021638B1

(12) United States Patent
Banner

(10) Patent No.: US 11,021,638 B1
(45) Date of Patent: Jun. 1, 2021

(54) COMPOSITION AND METHODS FOR CONTROLLING DUST

(71) Applicant: Swamp Fox Innovations, LLC, Ames, IA (US)

(72) Inventor: Larry Todd Banner, Ames, IA (US)

(73) Assignee: Swamp Fox Innovations, LLC, Ames, IA (US)

( * ) Notice: Subject to any disclaimer, the term of this patent is extended or adjusted under 35 U.S.C. 154(b) by 38 days.

(21) Appl. No.: 16/373,058

(22) Filed: Apr. 2, 2019

Related U.S. Application Data

(60) Provisional application No. 62/651,476, filed on Apr. 2, 2018, provisional application No. 62/658,200, filed on Apr. 16, 2018.

(51) Int. Cl.
*C09K 3/22* (2006.01)

(52) U.S. Cl.
CPC ..................... *C09K 3/22* (2013.01)

(58) Field of Classification Search
CPC ........................................................ C09K 3/22
See application file for complete search history.

(56) References Cited

U.S. PATENT DOCUMENTS

| | | | | |
|---|---|---|---|---|
| 2006/0118009 A1* | 6/2006 | Hubbs | ................. | E01C 7/36 106/287.11 |
| 2006/0201444 A1 | 9/2006 | Coss et al. | | |
| 2007/0048096 A1* | 3/2007 | Hubbs | ................. | E01C 7/36 405/263 |

FOREIGN PATENT DOCUMENTS

| DE | 10329974 A1 | 1/2005 |
|---|---|---|
| EP | 0990689 A2 | 4/2000 |

OTHER PUBLICATIONS

Yan et al., "Dust Suppression with Glycerin from Biodiesel Produciton: A Review", "Journal of Environmental Protection", Feb. 2012, pp. 218-224, No. 3, Publisher: Scientific Research.

* cited by examiner

*Primary Examiner* — Andrew J. Oyer
(74) *Attorney, Agent, or Firm* — Davis, Brown, Koehn, Shors & Roberts, P.C.; Matthew Coryell

(57) ABSTRACT

The disclosed method of reducing dust from livestock footing comprises preparing a liquid dedusting composition comprising a 1-dodecene homopolymer (PAO) and applying the composition to the livestock footing. In certain aspects, the dedusting composition has a kinematic viscosity of between about 4 centistokes and about 10 centistokes at 100° C. In further aspects, the composition is applied to the footing at a rate of between about 0.25% and about 1.5% (w/w). Further disclosed in a kit for dedusting livestock footing comprising a dedusting composition comprising 1-dodecene homopolymer (PAO) having a kinematic viscosity of between about 4 centistokes and about 10 centistokes at 100° C. and an applicator, configured and arranged to disperse the dedusting composition in the form of droplets between about 105 μm VDM and about 665 μm VDM.

16 Claims, 2 Drawing Sheets

| SPECIFICATION | PAO 4 | PAO 6 | PAO 7 | PAO 8 | PAO 10 |
|---|---|---|---|---|---|
| Appearance | Clear | Clear | Clear | Clear | Clear |
| Color, Pt/Co or | 30 max | 30 max | 30 max | 30 max | 30 max |
| Color, ASTM | 0.5 max | 0.5 max | 0.5 max | 0.5 max | 0.5 max |
| Kinematic Viscosity (cS t) @ 100°C | 3.8 - 4.2 | 5.6 - 6.0 | 6.7 - 7.2 | 7.7 - 8.2 | 9.4 - 10.9 |
| Flash Point (COC), °C | 200 min | 230 min | 240 min | 230 min | 245 min |
| Pour Point, °C | -54 max | -54 max | -40 max | -40 max | -40 max |
| Water, ppm | 50 max | 50 max | 50 max | 50 max | 50 max |
| TYPICAL PROPERTIES | | | | | |
| Specific Gravity 15.6°/15.6°C | 0.82 | 0.827 | 0.8306 | 0.832 | 0.835 |
| Kinematic Viscosity (cS t) @ 40°C | 18 | 31 | 37.7 | 46 | 65 |
| Kinematic Viscosity (cS t) @ -40°C | 2,700 | 7,600 | 10,732 | 18,000 | 38,000 |
| Viscosity Index | 125 | 135 | 146 | 135 | 138 |
| Density, lb/gal | 6.837 | 6.896 | 6.917 | 6.937 | 6.962 |
| Acid Number, mg KOH/g | 0.01 | 0.01 | <0.03 | 0.01 | 0.01 |

| SPECIFICATION | PAO 4 | PAO 6 | PAO 7 | PAO 8 | PAO 10 |
|---|---|---|---|---|---|
| Appearance | Clear | Clear | Clear | Clear | Clear |
| Color, Pt/Co or | 50 max | 50 max | 50 max | 50 max | 50 max |
| Color, ASTM | 0.5 max | 0.5 max | 0.5 max | 0.5 max | 0.5 max |
| Kinematic Viscosity (cS t) @ 100°C | 3.8 - 4.2 | 5.6 - 6.0 | 6.7 - 7.2 | 7.7 - 8.2 | 9.4 - 10.9 |
| Flash Point (COC), °C | 200 min | 230 min | 240 min | 230 min | 245 min |
| Pour Point, °C | -54 max | -54 max | -40 max | -40 max | -40 max |
| Water, ppm | 50 max | 50 max | 50 max | 50 max | 50 max |
| TYPICAL PROPERTIES | | | | | |
| Specific Gravity 15.6°/15.6°C | 0.82 | 0.827 | 0.8306 | 0.832 | 0.835 |
| Kinematic Viscosity (cS t) @ 40°C | 18 | 31 | 37.7 | 46 | 65 |
| Kinematic Viscosity (cS t) @ -40°C | 2,700 | 7,600 | 10,732 | 18,000 | 38,000 |
| Viscosity Index | 125 | 135 | 146 | 135 | 138 |
| Density, lb/gal | 6.837 | 6.896 | 6.917 | 6.937 | 6.962 |
| Acid Number, mg KOH/g | 0.01 | 0.01 | <0.03 | 0.01 | 0.01 |

FIG. 1

| Water Activity (AW) | PAO7 Target |
|:---:|:---:|
| < 0.10 | 1.50% |
| < 0.35 | 1.00% |
| 0.35 - 0.55 | 0.75% |
| 0.55 - 0.75 | 0.25% |
| > 0.75 | 0.0% |

FIG. 2

COMPOSITION AND METHODS FOR CONTROLLING DUST

CROSS-REFERENCE TO RELATED APPLICATION(S)

This application claims priority to U.S. Provisional Application No. 62/651,476, filed Apr. 2, 2018 and entitled "COMPOSITION AND METHODS FOR CONTROLLING DUST," and U.S. Provisional Application No. 62/658,200 filed Apr. 16, 2018 and entitled "COMPOSITION AND METHODS FOR CONTROLLING DUST," each of which is hereby incorporated by reference in its entirety under 35 U.S.C. § 119(e).

TECHNICAL FIELD

The disclosure relates to compositions and methods of reducing dust from livestock footing materials.

BACKGROUND

Airborne dust negatively impacts the health and comfort of both humans and livestock. The problems with airborne dust arise in a variety of settings, including but not limited to indoor and outdoor livestock arenas, livestock buildings, sports fields, and recreational areas. The movement in the arena or on other footing surfaces can create excessive amounts of dust, which can lead to respiratory problems for both animals and humans.

Presently, there are two common methods for dust management in livestock arenas and barns. One method is to apply magnesium chloride, which reduces dust by retaining moisture from the air. The other method is to apply water to the arena. However, both methods present efficacy, environmental, and cost concerns. Magnesium chloride, though inexpensive to purchase and apply, is both less effective and highly corrosive. While water is more effective, it must be applied frequently, which is costly and time intensive. This is because frequent application, in addition to being labor intensive, may also require expensive equipment such as water wagons or indoor sprinkler systems. Additionally, the barn owner would need to either have access to a water well or purchase water from the city. Furthermore, during winter months, water may freeze, making application difficult and creating hazardous slippery conditions. Environmental concerns can also arise in association with footing disposal. For example, if arena footing containing large amounts of salt was removed from the arena and disposed in the environment the salts could impact plant and animal life around the disposal site.

Accordingly, there is a need in the art for a solution that can effectively reduce dust when applied to an arena's footing surface that is also 1) easy to apply, 2) long-lasting, 3) environmentally friendly, 4) safe for humans and livestock, 5) non-corrosive, and 6) affordable. The present invention relates to a long-lasting composition and method for application that reduces dust in an easy, safe, environmentally friendly and affordable manner.

BRIEF SUMMARY

Disclosed herein is a method of reducing dust from livestock footing material by preparing a liquid dedusting composition comprising a 1-dodecene homopolymer (PAO) and applying the composition to the livestock footing. According to certain embodiments, the dedusting composition has a kinematic viscosity of between about 4 centistokes and about 10 centistokes at 100° C. In further embodiments, the dedusting composition has a kinematic viscosity of about 7 centistokes at 100° C.

According to certain aspects, the composition is applied to the footing at a rate of between about 0.25% and about 1.5% (w/w). In further aspects, the composition is applied to the footing at a rate of between about 0.25% and about 1% (w/w). In yet further aspects, the composition is applied to the footing at a rate of about 0.75% (w/w).

According to certain embodiments, the method further comprises the step of determining water activity of the footing and adjusting application rate of the composition based on the water activity, wherein the water activity of the footing is inversely proportional to the application rate of the dedusting composition.

In certain aspects, the dedusting composition further comprises a mineral oil. In exemplary embodiments, the mineral oil is white mineral oil. In further exemplary embodiments, the mineral oil has viscosity of between about 3 centistokes and about 10 centistokes at 100° C. In yet further exemplary embodiments, the viscosity of the mineral oil is approximately equal to viscosity of the PAO.

In certain embodiments, the method further comprises a step of agitating the footing. In certain exemplary embodiments, agitating the footing is performed simultaneously with applying composition. In certain alternative embodiments, the footing may be agitated immediately following the application According to certain aspects, the disclosed method further comprises the step of determining the amount of PAO in the footing. According to certain aspects of these embodiments, an additional amount of the composition is applied if the amount of PAO is determined to be less than about 0.7% of the footing.

Further disclosed herein is a kit for dedusting livestock footing comprising a dedusting composition comprising 1-dodecene homopolymer (PAO) having a kinematic viscosity of between about 4 centistokes and about 10 centistokes at 100° C. and an applicator, configured and arranged to disperse the dedusting composition in the form of droplets between about 105 µm volume median diameter (VDM) and about 665 µm VDM.

BRIEF DESCRIPTION OF THE DRAWINGS

FIG. 1 shows a table of PAO properties according to exemplary embodiments.

FIG. 2 shows a table of application rates at different water activity, according to certain embodiments.

DETAILED DESCRIPTION

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein "PAO" means the polymer polyalphaolefin (1-dodecene homopolymer). As will be appreciated by those skilled in the art, the viscosity of PAO is determined by the degree of its polymerization. The viscosity of PAO used in various embodiments described herein is defined as PAO X, where X is the measure of kinematic viscosity in centistokes of the PAO at 100° C. For example PAO 7 connotes PAO that has a kinematic viscosity of 7 centistokes of the PAO at 100° C.

As used herein, the term "livestock footing material" refers to material used to cover the surface of an arena, including stalls and bedding material. Footing material is typically comprised of sand and/or dirt, soil, wood-chip, peat moss, sawdust, and clay, and/or, mixtures thereof. In exemplary embodiments, livestock footing material is typically several inches thick on the flooring.

Disclosed herein is a method of reducing dust from livestock footing material. According to the disclosed method, a liquid dedusting composition comprising a 1-dodecene homopolymer (PAO) is prepared and the composition is applied to the livestock footing. In certain aspects, the livestock footing material is a sand based equestrian footing material as is typically found in indoor horse riding arenas. According to further embodiments, the disclosed method may be used to reduce dust in sand-based flooring arenas including: indoor livestock exhibition arenas, outdoor equestrian riding arenas, indoor livestock barns, and indoor free-range poultry barns.

According to certain embodiments, the dedusting composition may be prepared with a range of suitable viscosities, with the viscosity being determined by the degree of polymerization of the PAO. In certain aspects, the dedusting composition has a kinematic viscosity ranging from between about 4 centistokes and about 10 centistokes at 100° C. In certain aspects, the dedusting composition has a kinematic viscosity ranging from between about 5 centistokes and about 9 centistokes at 100° C. In certain aspects, the dedusting composition has a kinematic viscosity ranging from between about 6 centistokes and about 8 centistokes at 100° C. In further embodiments, the dedusting composition has a kinematic viscosity of about 7 centistokes at 100° C.

According to certain aspects, the composition is applied to the footing at a rate of between about 0.25% and about 1.75% (w/w) (weight of composition/weight of footing). In further aspects, the composition is applied to the footing at a rate of between about 0.5% and about 1.5% (w/w). In yet further aspects, the composition is applied to the footing at a rate of about 1.0% (w/w).

According to certain exemplary embodiments, the disclosed method further comprises the step of determining the relative level of dust emitted from a pre-treated footing. In exemplary aspects of these embodiments, footing determined to have a relative low level of dust will be treated with a lower rate of composition (e.g., 0.5%-0.75% (w/w)). Footing determined to have relatively high levels of dust are treated with a relatively higher rate of dedusting composition (e.g., 1%-1.5% (w/w)).

According to certain embodiments, the method further comprises the step of determining ambient humidity and adjusting application rate of the composition based on the ambient humidity. According to exemplary aspects of these embodiments, as ambient humidity increases, the application rate of the composition is decreased.

According to further embodiments, the method comprises the step of determining the water activity of the footing, prior to the step of administering the dedusting composition to the footing. In exemplary implementations of these embodiments, the rate of dedusting composition is adjusted according to the determined water activity, such that a higher water activity indicates the need for a lower rate of dedusting composition and a lower water activity indicates the need for higher rate of dedusting composition addition. As will be appreciated by those skilled in the art, water activity can vary widely over the course of a year and is affected by a variety of factors, such as changes in atmospheric humidity. In exemplary embodiments, water activity of the footing is determined during the driest periods of the year and the rate of dedusting composition to be applied is determined accordingly. In certain implementations, the rate of application of the dedusting composition is determine according to table in FIG. 2.

According to still further embodiments, the disclosed method further comprises the step of providing supplemental applications of dedusting composition after an interval of time. In certain implementations, the time interval is between about three months to about six months following the initial application of the composition. In exemplary implementations of these embodiments, the supplemental administration comprises administering between about 20% to about 30% of the initial amount of the dedusting composition.

In certain aspects, the dedusting composition may further comprise one or more additional components. In certain embodiments, the dedusting composition further comprises a mineral oil. In exemplary embodiments, the mineral oil is white mineral oil. In further exemplary embodiments, the mineral oil has viscosity of between about 3 centistokes and about 10 centistokes at 100° C. In yet further exemplary embodiments, the viscosity of the mineral oil is approximately equal to viscosity of the PAO.

In certain embodiments, the method further comprises a step of agitating the footing. As will be appreciated by a person having skill in the art, agitation of the footing may be achieved by a number of methods. In exemplary embodiments, the agitation step may be performed by way of a rake or a drag. In alternative embodiments, the agitation step may be performed by the hooves of an animal walking through the footing.

The timing of the performance of the agitation step may vary according to certain embodiments. In certain embodiments, the step of agitating the footing is performed simultaneously with applying composition. According to certain aspects of these embodiments, an application nozzle may be mounted on a rake or drag to effectuate the simultaneous application of the dedusting composition and agitation of the footing. According In certain alternative embodiments, the footing may be agitated immediately fooling the application.

According to certain embodiments, the composition is applied to the footing with a nozzle, or similar device, that produces a steady stream but that avoids producing an aerosol mist of the composition. Because extremely fine droplets of the composition can create safety and/or health risks, in certain embodiments, the composition is applied with an applicator the produces an average droplet size of at least about 105 micron volume median diameter (VDM). According to further embodiments, the composition is applied with an applicator the produces an average droplet size of at least about 236 µm VDM. According to still further embodiments, the composition is applied with an applicator the produces an average droplet size of at least about 404 µm VDM. According to still further embodiments, the composition is applied with an applicator the produces an average droplet size of at least about 665 µm VDM.

According to certain aspects, the disclosed method further comprises the step of determining the amount of PAO in the footing. According to certain aspects of these embodiments, an additional amount of the composition is applied if the amount of PAO is determined to be less than about 0.7% of the footing.

In instantly disclosed dedusting composition yields significantly longer dedusting activity compared to known compositions. For example, in contrast to glycerin based compositions which loose effectiveness after approximately 7 days, in certain embodiments, the presently disclosed compositions reduce livestock footing dust for over 5 weeks. According to certain embodiments, the disclosed method and composition is effective at reducing or eliminating dust emission from footing for between three and six months. According to further embodiments, the disclosed method and composition is effective at reducing or eliminating dust emission from footing for between six and nine months. In yet further embodiments, the disclosed method and composition is effective at reducing or eliminating dust emission from footing for between nine and twelve months. In still further embodiments, the disclosed method and composition is effective at reducing or eliminating dust emission from footing for between twelve and eighteen months.

In addition to demonstrating increased duration which minimizes the frequency of re-application and reduces overall costs, the instantly disclosed composition and methods provide a non-corrosive, safe alternative to known composition used to control dust. For instance, the compositions disclosed do not pose safety risks to humans and livestock that may be exposed to the composition or come into contact with the composition. In addition, the disclosed compositions are environmentally-friendly. Both the safety and environmental benefits are particularly advantageous in comparison to known compositions. Furthermore, in contrast to glycerin based compositions which must be mixed with water or prepared as an emulsion, the instantly disclosed composition can be applied as a neat oil, thereby reducing preparation and application costs. Still further, many known dedusting compositions have a relatively low viscosity and require the addition of binders, such as polyisobutylene, to meet regulatory safety standards. In contrast, the instantly disclosed composition are able to effectively control dust without the addition of binders.

Accordingly, for at least the reasons described herein, the instantly disclosed compositions and methods demonstrate significant commercial, safety, and environmental advantages over other known compositions and methods of dust reduction.

According to certain alternative embodiments, a liquid dedusting composition comprising a mineral oil is prepared and the composition is applied to the livestock footing. In certain exemplary embodiments, the mineral oil is a white mineral oil. According to certain aspects of these embodiments, the dedusting composition may be prepared with a range of suitable viscosities. In certain aspects, the dedusting composition has a kinematic viscosity ranging from between about 3 centistokes to about 10 centistokes at 100° C. According to further exemplary embodiments, the viscosity of the mineral oil is approximately equal to the viscosity of the PAO.

Further disclosed herein is a kit for dedusting footing. In exemplary embodiments, the dedusting kit comprises a dedusting composition comprising PAO and applicator nozzle for applying the PAO. In certain aspects, the dedusting composition has a kinematic viscosity ranging from between about 4 centistokes and about 10 centistokes at 100° C. In certain aspects, the dedusting composition has a kinematic viscosity ranging from between about 5 centistokes and about 9 centistokes at 100° C. In certain aspects, the dedusting composition has a kinematic viscosity ranging from between about 6 centistokes and about 8 centistokes at 100° C. In further embodiments, the dedusting composition has a kinematic viscosity of about 7 centistokes at 100° C.

According to certain embodiments, the applicator in the kit applicator produces an average droplet size of at least about 105 micron volume median diameter (VDM). According to further embodiments, the composition is applied with an applicator the produces an average droplet size of at least about 236 µm VDM. According to still further embodiments, the composition is applied with an applicator the produces an average droplet size of at least about 404 µm VDM. According to still further embodiments, the composition is applied with an applicator the produces an average droplet size of at least about 665 µm VDM.

EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Example 1

About 70 lbs of PAO 7 was applied to a circular area (50 ft diameter) within a sand-based indoor equine riding arena. The material was applied to the footing using a hand sprayer with nozzle that produced a steady stream of product (not an aerosol). The PAO was mixed into the sand using a hand-rake. The airborne-dust that could be emitted from the footing was immediately reduced. The footing was later found to have about 0.4% PAO (weight of PAO 7/weight of footing).

Example 2

About 200 grams sand-based arena footing was placed into each of two plastic containers. About 1.0 gram of PAO6 was placed into one container and about 2.0 grams of PAO6 was placed into a separate container. Both PAO samples were mixed using a spatula to provide footing samples containing 0.5% and 1.0% PAO6 containing footing, respectively. When compared to a negative control (no PAO6 added), both samples had significantly less dust emissions when stirred with a spatula. The PAO samples, along with a negative control, were placed into a humidity chamber with a temperature of about 68° F. and >85% humidity. The samples were removed from the chamber and analyzed for PAO6 following 82 days and 152 days incubation. The 0.5% PAO6 sample contained 0.36% PAO after 82 days and 0.36% PAO after 152 days incubation. The 1.0% PAO6 sample contained 0.81% PAO after 82 days and 0.80% PAO after 152 days incubation. Following 152 days incubation the samples were sat at ambient temperature and humidity (about 68° F. and 20% humidity) for about three days, in order to evaporate excess moisture from the samples. The samples were stirred with a spatula and dust emissions were observed. The dust emissions from both the 0.5% PAO6 and 1.0% PAO6 samples were significantly reduced compared to the negative control.

Analytical Procedure to determine PAO content in arena footing—About 5.5 g of footing, containing PAO, was weighed into a 50 mL centrifuge tube. About 6.0 g of n-heptane (99%, Acros Organics) was added to the tube containing the footing. The tube was capped and then mixed vigorously on a vortex for about 30 seconds, extracting the PAO from the footing into the heptane. The tube sat at ambient for about 10 minutes and the footing settled to the bottom of the tube. The top, heptane layer, was removed from the tube with a pipette and place into a 5 mL centrifuge tube with a 0.45 micron nylon syringe filter attached. The heptane layer was filtered into an aluminum weigh dish (VWR Scientific). The weigh dish, containing the heptane filtrate, was placed into a fume hood overnight at ambient, evaporating the heptane and leaving the PAO residue. The PAO content in the footing was then determined gravimetrically.

For validation purposes, a negative control (no PAO 6 added to footing) and positive control (PAO 6 added to achieve 1.0% PAO in footing) were analyzed with the same procedure. The negative control yielded 0.00% PAO and the positive control yielded 0.98% PAO.

Example 3

PAO7 was applied at a rate of 1% to footing within a horse barn with moderate dust levels. Dust emission was intermittently assessed over a 1 year period following application of the composition. The barn demonstrated no discernable dust emissions during the entire one year trial period.

Example 4

An indoor horse riding arena was selected for a field trial. The barn was 90 ft×66 ft. It contained sand-based footing that was about 1.5-2.0 inches deep. When riding a horse in this arena dust emissions were observed to rise to the ceiling of the barn (~20 ft) and stay in the air for at least one hour.

PAO7 was applied to the footing by pouring 5-gallon pails with pour spout into a back-pack, hand-based, water sprayer (typically used for spraying water-based solutions onto yards, gardens, etc.). The spray nozzle was removed from the sprayer so that a steady stream was casted onto the footing surface. After application the footing was mixed with a rake that was pulled behind a tractor.

The material was applied gradually to determine the de-dust effectiveness vs concentration of PAO7 in the footing. Over about one month, seven 5-gallon pails were applied until the concentration of PAO7 in the footing was about 0.5%. During the course of the application the dust emissions decreased, in a dose-response fashion, until none were observed. A control section of the barn, which did not have the material applied, continued to have dust emissions.

After an additional one month dust emissions began to be observed again. When riding a horse in the arena the dust would rise about 3-4 feet and then settle down to the ground within a few minutes. An additional two, 5-gallon pails were applied to the footing. After raking, the dust emissions immediately fell to non-observable levels. The PAO7 concentration in the footing was found to be about 0.6%.

No dust emissions were observed for about the following six months. The barn owner again reported that dust emissions were rising to about 3-4 feet when riding. An additional three, 5-gallon pails were applied to the footing. After raking, the dust emissions immediately fell to non-observable levels. No dust emissions were observed for the following 6 months.

Although the disclosure has been described with reference to preferred embodiments, persons skilled in the art will recognize that changes may be made in form and detail without departing from the spirit and scope of the disclosed apparatus, systems and methods.

What is claimed is:

1. A method of reducing dust from livestock footing comprising:
    a. preparing a liquid dedusting composition comprising a 1-dodecene homopolymer (PAO); and
    b. applying the composition to the livestock footing.

2. The method of claim 1, wherein the dedusting composition has a kinematic viscosity of between about 4 centistokes and about 10 centistokes at 100° C.

3. The method of claim 2, wherein the dedusting composition has a kinematic viscosity of about 7 centistokes at 100° C.

4. The method of claim 1 wherein the composition is applied to the footing at a rate of between about 0.25% and about 1.5% (w/w).

5. The method of claim 4 wherein the composition is applied to the footing at a rate of between about 0.25% and about 1% (w/w).

6. The method of claim 4 wherein the composition is applied to the footing at a rate of about 0.75% (w/w).

7. The method of claim 4, further comprising the step of determining water activity of the footing and adjusting application rate of the composition based on the water activity, wherein as water activity of the footing increases, the application rate decreases.

8. The method of claim 1, wherein the dedusting composition further comprises a mineral oil.

9. The method of claim 8, wherein the mineral oil is white mineral oil.

10. The method of claim 8, wherein the mineral oil has viscosity of between about 3 centistokes and about 10 centistokes at 100° C.

11. The method of claim 10, wherein the viscosity of the mineral oil is approximately equal to viscosity of the PAO.

12. The method of claim 1, further comprising the step of agitating the footing.

13. The method of claim 12, wherein the agitating the footing is performed simultaneously with applying composition.

14. The method of claim 1, further comprising the step of determining the amount of PAO in the footing.

15. The method of claim 14, wherein an additional amount of the composition is applied if the amount of PAO is determined to be less than about 0.7% of the footing.

16. A kit for dedusting livestock footing comprising:
   a. a dedusting composition comprising 1-dodecene homopolymer (PAO) having a kinematic viscosity of between about 4 centistokes and about 10 centistokes at 100° C.; and
   b. an applicator, configured and arranged to disperse the dedusting composition in the form of droplets between about 105 μm volume median diameter (VDM) and about 665 μm VDM.

* * * * *